United States Patent [19]
Izumi et al.

[11] Patent Number: 5,610,895
[45] Date of Patent: Mar. 11, 1997

[54] OPTICAL HEAD HAVING LIGHT BLOCKING MEANS POSITIONED IN FRONT OF A DETECTOR FOR SUPER-RESOLUTION DETECTION

[75] Inventors: Haruhiko Izumi; Kyoko Miyabe, both of Kawasaki, Japan

[73] Assignee: Fujitsu Limited, Japan

[21] Appl. No.: 604,362

[22] Filed: Feb. 21, 1996

Related U.S. Application Data

[63] Continuation of Ser. No. 224,047, Apr. 7, 1994.

[30] Foreign Application Priority Data

Jun. 21, 1993 [JP] Japan .................................. 5-149489

[51] Int. Cl.⁶ ...................................................... G11B 7/135
[52] U.S. Cl. .................... 369/112; 369/44.24; 369/44.23; 369/118
[58] Field of Search ............................... 369/13, 110, 112, 369/107, 118, 44.24, 119, 114, 44.23

[56] References Cited

U.S. PATENT DOCUMENTS

| | | | |
|---|---|---|---|
| 5,072,437 | 12/1991 | Chikuma | 369/118 |
| 5,121,378 | 6/1992 | Hirose et al. | 369/118 |
| 5,153,873 | 10/1992 | Spruit et al. | 369/118 |
| 5,247,510 | 9/1993 | Lee et al. | 369/118 |
| 5,322,993 | 6/1994 | Ohyama | 369/118 |
| 5,349,592 | 9/1994 | Ando | 369/112 |
| 5,450,237 | 9/1995 | Yoshida et al. | 369/112 |

FOREIGN PATENT DOCUMENTS

| | | |
|---|---|---|
| 2210625 | 8/1990 | Japan . |
| 3266224 | 11/1991 | Japan . |

OTHER PUBLICATIONS

Yamanaka, et al., "High Density Recording by Superresolution in an Optical Disk Memory System," Applied Optics, vol. 29, No. 20, pp. 3046–3051, Jul. 10, 1990.

*Primary Examiner*—Georgia Y. Epps
*Assistant Examiner*—Kim-Kwok Chu
*Attorney, Agent, or Firm*—Greer, Burns & Crain, Ltd.

[57] ABSTRACT

An optical head includes a lens system forming light reflected from an optical disk into parallel rays, a focal error and tracking error detection system detecting focal error and tracking error based on the parallel rays, an optical reproduced signal detection system detecting a reproduced signal reproduced from the optical disk based on the parallel rays, and a light blocking part for blocking, out of the parallel rays, at least a central portion in a light amplitude distribution of parallel rays supplied to the optical reproduced signal detection system.

10 Claims, 9 Drawing Sheets

OPTICAL HEAD HAVING LIGHT BLOCKING MEANS POSITIONED IN FRONT OF A DETECTOR FOR SUPER-RESOLUTION DETECTION

This is a continuation of copending application Ser. No. 08/224,047, filed on Apr. 7, 1994.

BACKGROUND OF THE INVENTION

The present invention generally relates to optical heads and optical recording and/or reproducing methods, and more particularly to an optical head and an optical recording and/or reproducing method which are suited for carrying out high density recording and/or reproduction of information with respect to an optical disk.

An optical disk unit can be used as a storage unit such as a file system, and is suited for storing programs and large amounts of data. For this reason, there are increasing demands to use an optical disk such as a magneto-optic disk for mass storage units of multi-media systems which are rapidly developing. In order to satisfy such demands, it is desirable to develop an optical head and an optical recording method which are suited for recording information on the optical disk with a high density.

Figure 1:
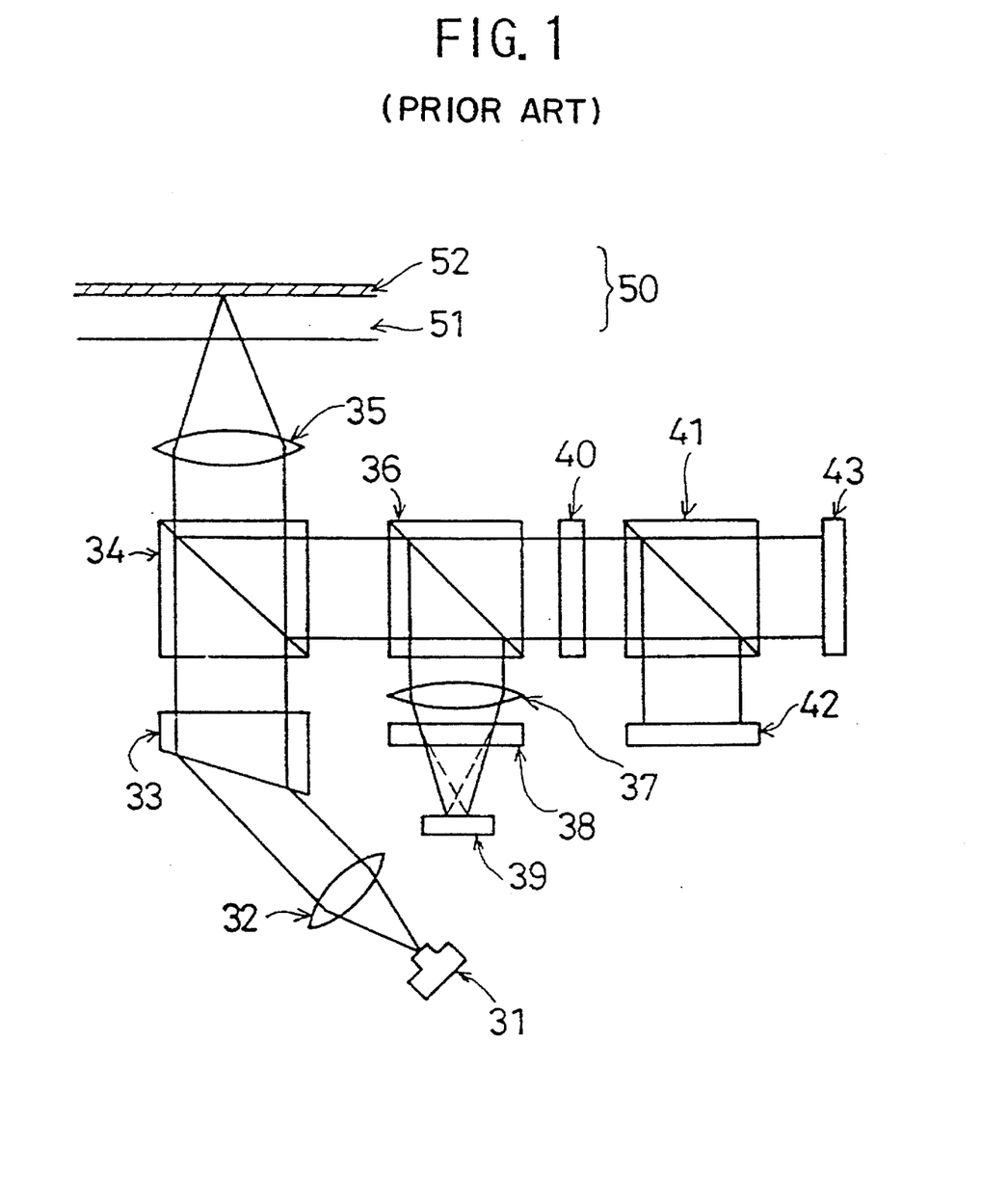
FIG. 1 is a diagram showing an example of a conventional magneto-optic head.

FIG. 1 shows an example of a conventional magneto-optic head. In FIG. 1, a light beam emitted from a semiconductor laser 31 is formed into parallel rays by a collimator lens 32, and thereafter formed into parallel rays having a circular cross section by a true-circular correction prism 33. The parallel rays from the true-circular correction prism 33 are supplied to an objective lens 35 via a beam splitter 34, and converged on a magneto-optic disk 50 by the objective lens 35. The magneto-optic disk 50 includes a transparent substrate 51 and a recording layer 52, and the objective lens 35 converges the parallel rays from the beam splitter 34 on the recording layer 52 of the magneto-optic disk 50.

The reflected light from the magneto-optic disk 50 is formed into parallel rays by the objective lens 35, and reflected by the beam splitter 34. The reflected light from the beam splitter 34 is divided into two beams by a beam splitter 36, one beam being supplied to a focal error and tracking error detection system and the other beam being supplied to a magneto-optic reproduced signal detection system.

The focal error and tracking error detection system includes a condenser lens 37, a cylindrical lens 38, and a 4-element photodetector 39. A focal error signal and a tracking error signal are generated based on outputs of the 4-element photodetector 39 by well known techniques.

The magneto-optic reproduced signal detection system includes a ½ wave plate 40, a deflection beam splitter 41, and photodetectors 42 and 43. A magneto-optic reproduced signal is generated based on outputs of the photodetectors 42 and 43.

Figure 2:
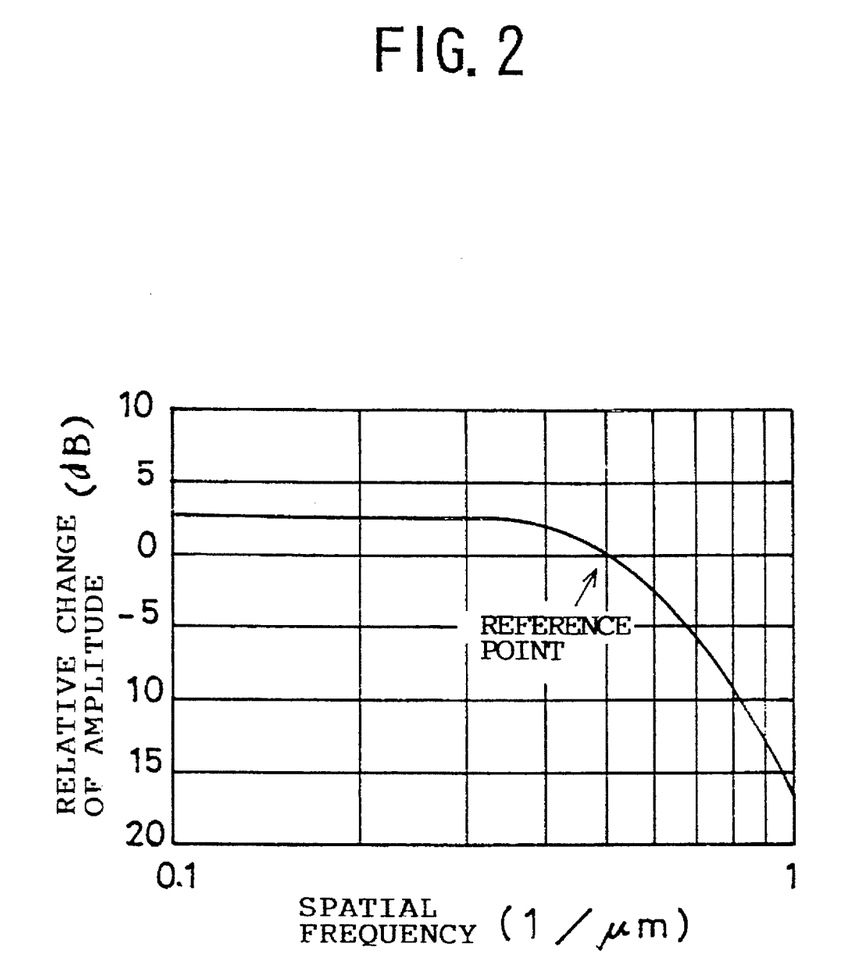
FIG. 2 is a diagram showing a relationship of the spatial frequency and the relative change of the amplitude of the reproduced wave for a case where information is recorded on and reproduced from a magneto-optic disk using the magneto-optic head shown in FIG. 1.

FIG. 2 shows a relationship of the spatial frequency and the relative change of the amplitude of the reproduced wave for a case where the information is recorded on and reproduced from the magneto-optic disk 50 using the magneto-optic head shown in FIG. 1. The spatial frequency refers to an inverse number of the period of recording marks on the magneto-optic disk 50.

As may be seen from FIG. 2, the spatial frequency becomes high if the recording density on the magneto-optic disk 50 is increased, and the reproduced waveform consequently deteriorates due to the resolution limit of the optical system of the magneto-optic head. In FIG. 2, there is notable deterioration in the reproduced waveform at spatial frequencies exceeding a "reference point".

Figure 3:
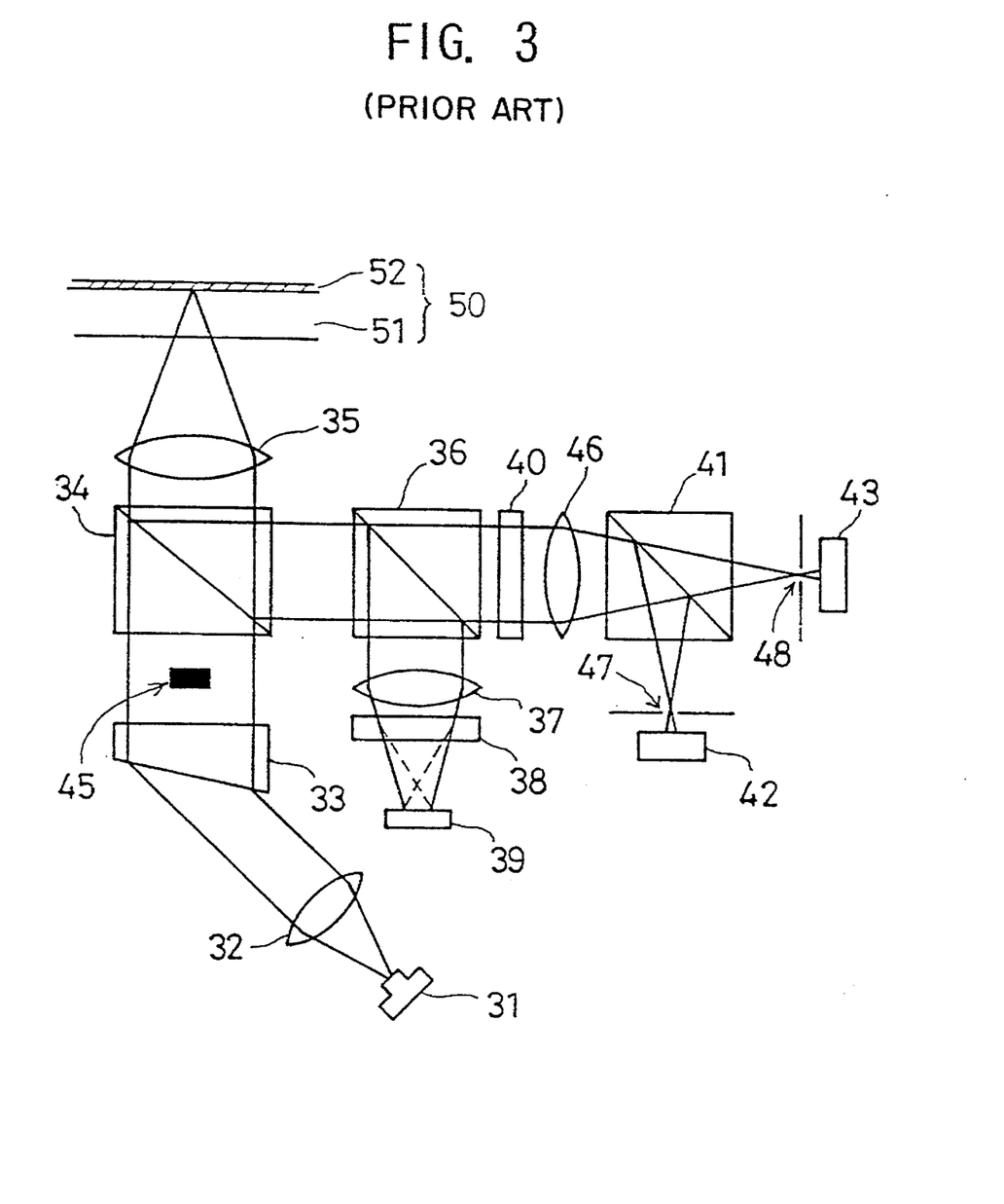
FIG. 3 is a diagram showing an example of a magneto-optic head using the super-resolution.

In order to solve this problem, a so-called "super-resolution" magneto-optic head shown in FIG. 3 has been proposed. In FIG. 3, those parts which are the same as those corresponding parts in FIG. 1 are designated by the same reference numerals, and a description thereof will be omitted. For example, the magneto-optic head shown in FIG. 3 is described in Yamanaka et al., "High Density Recording by Super resolution in an Optical Disk Memory System", Applied Optics, Vol. 29, No. 20, pp. 3046–3051, Jul. 10, 1990.

As shown in FIG. 3, a light blocking band 45 is provided between the true-circular correction prism 33 and the beam splitter 34, and a condenser lens 46 is provided between the ½ wave plate 40 and the deflection beam splitter 41. In addition, slits or pinholes 47 and 48 are respectively provided between the deflection beam splitter 41 and the photodetectors 42 and 43. The light blocking band 45 blocks the light at a central portion of the parallel rays in advance to eliminate low-frequency components, by using the fact that the light amplitude distribution of the light spot converged on the magneto-optic disk 50 and the light amplitude distribution of the parallel rays are in a Fourier transform relationship. Accordingly, when the light obtained via the light blocking band 45 and the beam splitter 34 is converged on the magneto-optic disk 50 by the objective lens 35, it is possible to reduce the diameter of the light spot converged on the magneto-optic disk 50 because the light of the low frequency components which causes the spreading does not exist, thereby making it possible to improve the resolution.

As reported in Yamanaka et al. referred above, when the super-resolution is employed, subsidiary maximums are introduced in the light amplitude distribution of the light spot converged on the magneto-optic disk 50. For this reason, it is necessary to take measures to avoid undesirable effects of the subsidiary maximums on the reproduced waveform. Hence, the condenser lens 46 is used to converge the parallel rays on the photodetectors 42 and 43 via the deflection beam splitter 41. In addition, the light components caused by the subsidiary maximums are eliminated by the slits or pinholes 47 and 48.

However, according to the magneto-optic head shown in FIG. 3, a portion of the light to be irradiated on the magneto-optic disk 50 is blocked by the light blocking band 45. As a result, there was a problem in that the intensity of the light that can be irradiated on the magneto-optic disk 50 when recording the information becomes small.

SUMMARY OF THE INVENTION

Accordingly, it is a general object of the present invention to provide a novel and useful optical head and optical recording and/or reproducing method, in which the problem described above is eliminated.

Another and more specific object of the present invention is to provide an optical head comprising a lens system forming light reflected from an optical disk into parallel rays, a focal error and tracking error detection system detecting focal error and tracking error based on the parallel rays, an optical reproduced signal detection system detecting a reproduced signal reproduced from the optical disk based on the parallel rays, and light blocking means for blocking, out of the parallel rays, at least a central portion in a light amplitude distribution of parallel rays supplied to the optical reproduced signal detection system. According to the optical head of the present invention, the central portion of the parallel rays is blocked in the reproducing optical path of the optical system, not in the optical path which irradiates the light on the optical disk. For this reason, it is possible to improve the resolution of the optical disk without decreasing the light intensity of the light irradiated on the optical disk. Hence, the present invention is particularly suited for high density recording and/or reproduction of information with respect to the optical disk.

Still another object of the present invention is to provide an optical recording and/or reproducing method comprising the steps of (a) forming reflected light from an optical disk into parallel rays, (b) detecting focal error and tracking error based on the parallel rays, (c) detecting an optical reproduced signal reproduced from the optical disk based on the parallel rays, and (d) blocking, out of the parallel rays, at least a central portion in a light amplitude distribution of parallel rays used for the detection of the optical reproduced signal. According to the optical recording and/or reproducing method of the present invention, the central portion of the parallel rays is blocked in the reproducing optical path of the optical system, not in the optical path which irradiates the light on the optical disk. For this reason, it is possible to improve the resolution of the optical disk without decreasing the light intensity of the light irradiated on the optical disk. Hence, the present invention is particularly suited for high density recording and/or reproduction of information with respect to the optical disk.

Other objects and further features of the present invention will be apparent from the following detailed description when read in conjunction with the accompanying drawings.

DESCRIPTION OF THE PREFERRED EMBODIMENTS

Figure 4:
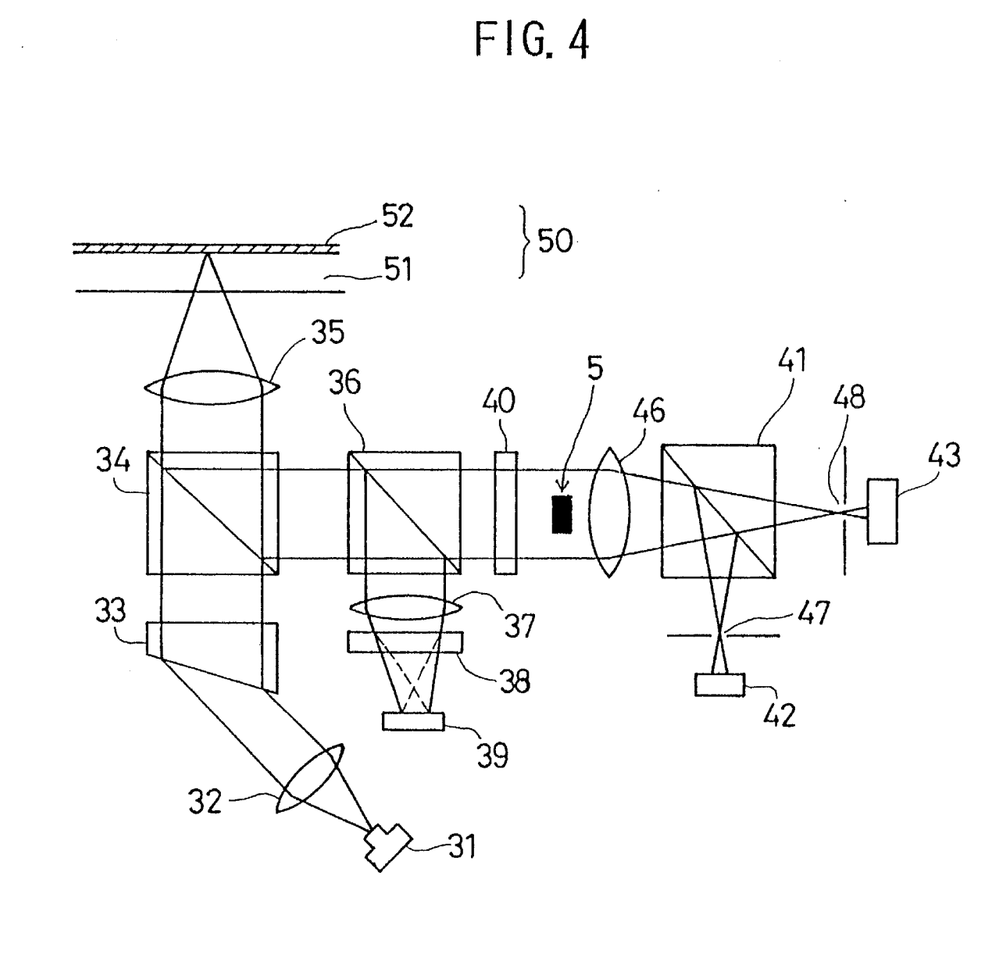
FIG. 4 is a diagram generally showing a first embodiment of an optical head according to the present invention.

FIG. 4 generally shows a first embodiment of an optical head according to the present invention. In this embodiment, the present invention is applied to a magneto-optic head. In FIG. 4, those parts which are the same as those corresponding parts in FIG. 3 are designated by the same reference numerals, and a description thereof will be omitted.

In this embodiment, a light blocking plate 5 is provided in a reproducing optical path of the optical system which processes the reflected light from the magneto-optic disk 50. More particularly, the light blocking plate 5 is arranged between the ½ wave plate 40 and the condenser lens 46. Accordingly, the light blocking plate 5 blocks a central portion of the parallel rays obtained via the ½ wave plate 40 before supplying the parallel rays to the condenser lens 46.

The light amplitude distribution of the light spot converged on the magneto-optic disk 50 and the light intensity distribution of the parallel rays are in a Fourier transform relationship. For this reason, this relationship does not change regardless of the optical path. In other words, this relationship is the same in the optical path in which the light is irradiated on the magneto-optic disk 50, and in the reproducing optical path which directs the reflected light from the magneto-optic disk 50 to the focal error and tracking error detection system or the magneto-optic reproduced signal detection system. Hence, even if the reflected light from the magneto-optic disk 50 is formed into the parallel rays by the objective lens 35 and the central portion of the parallel rays is thereafter blocked by the light blocking plate 5, it is possible to eliminate the undesirable effects of the low frequency components that cause spreading of the light spot converged on the magneto-optic disk 50. Therefore, it is possible to obtain a reproduced waveform which is essentially the same as that obtainable when the super-resolution described above is employed.

Figure 5:
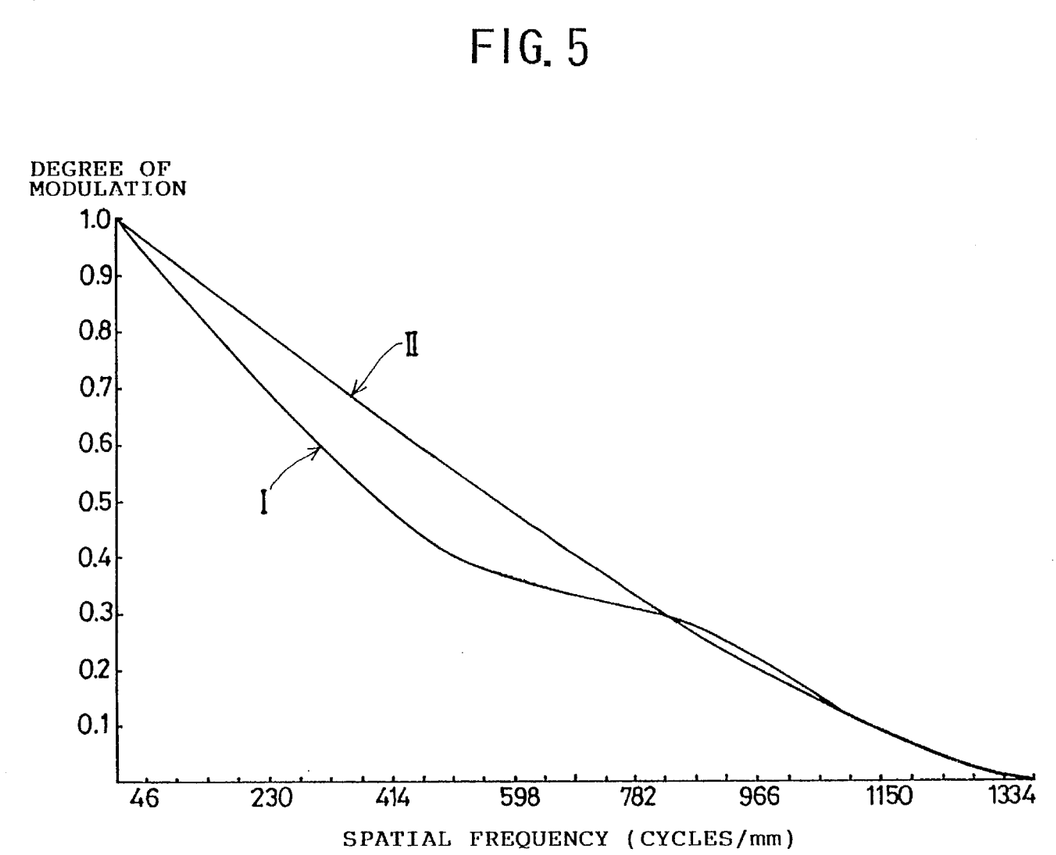
FIG. 5 is a diagram showing an amplitude characteristic of a transfer function (OTF) of the magneto-optic head.

FIG. 5 shows the amplitude characteristic of the transfer function (OTF: Optical Transfer Function) of the magneto-optic head. In FIG. 5, the ordinate indicates the degree of modulation, and the abscissa indicates the spatial frequency. A characteristic I is obtained in the case of the magneto-optic head shown in FIG. 4 having the light blocking plate 5. On the other hand, a characteristic II is obtained in the case of the conventional magneto-optic head shown in FIG. 1 having no such light blocking plate.

As may be seen by comparing the characteristics I and II shown in FIG. 5, the degree of modulation of the characteristic I becomes smaller at the low spatial frequencies compared to that of the characteristic II. On the other hand, the degree of modulation of the characteristic I becomes higher at the high spatial frequencies compared to that of the characteristic II. Hence, when the light blocking plate 5 is provided, it is possible to reduce the diameter of the light spot converged on the magneto-optic disk 50. As a result, it is possible to obtain a large degree of modulation at the high spatial frequencies, that is, it is possible to obtain a large light amplitude, even though the light blocking plate 5 is provided in the reproducing optical path of the optical system which processes the reflected light from the magneto-optic disk 50. In other words, a reproduced waveform having a very satisfactory resolution is obtainable according to this embodiment.

Figure 6A:
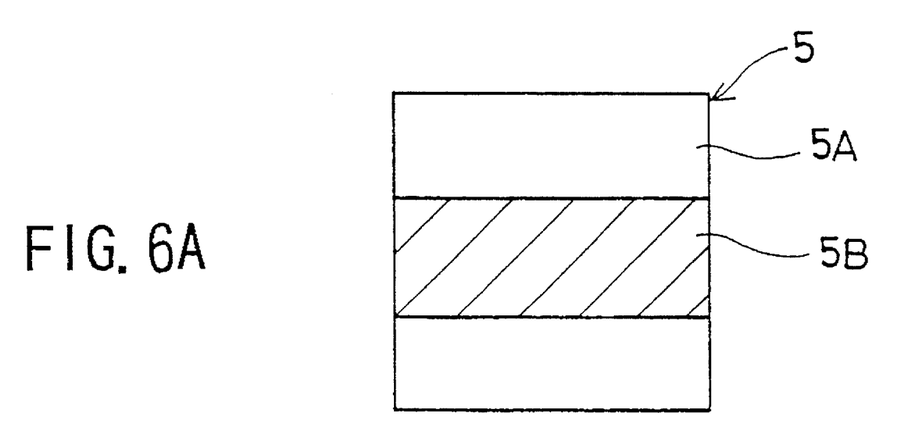
FIGS. 6A and 6B respectively are plan views showing embodiments of a light blocking plate.
Figure 6B:
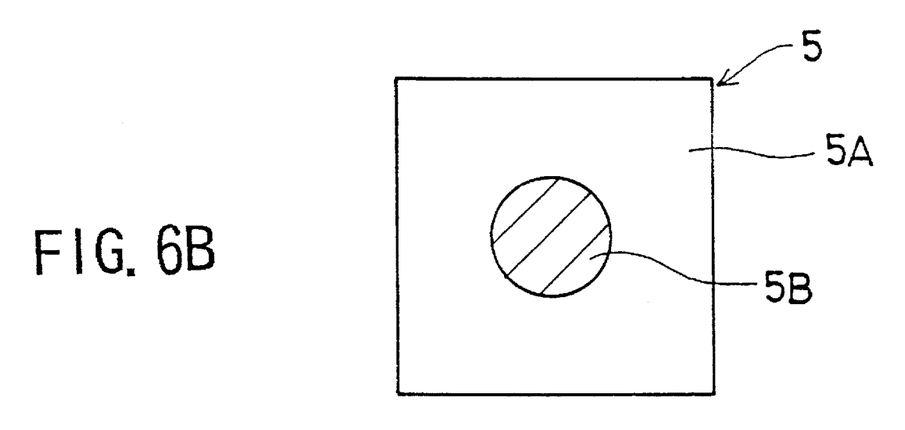

FIGS. 6A and 6B show embodiments of the light blocking plate 5.

The light blocking plate 5 shown in FIG. 6A includes a transparent substrate 5A, and a band-shaped non-transparent layer 5B formed on the transparent substrate 5A. The width of the non-transparent layer 5B is set so as to block the central portion of the reflected light from the magneto-optic disk 50.

On the other hand, the light blocking plate 5 shown in FIG. 6B includes a transparent substrate 5A, and a circular non-transparent layer 5B which is formed on the transparent substrate 5A. The diameter of the non-transparent layer 5B is set so as to block the central portion of the reflected light from the magneto-optic disk 50.

The shape of the non-transparent layer 5B of the light blocking plate 5 is of course not limited to those shown in FIGS. 6A and 6B. The non-transparent portion of the light blocking plate 5 may take an arbitrary shape that is set so as to improve the resolution in a direction in which recording tracks of the magneto-optic disk 50 extend.

As described above, the subsidiary maximums are introduced in the light amplitude distribution of the light spot converged on the magneto-optic disk 50 due to the provision of the light blocking plate 5. The slits or pinholes 47 and 48 are provided for the purpose of eliminating the light components caused by the subsidiary maximums. However, the positions of the slits or pinholes 47 and 48 need to be aligned in order to positively eliminate the light components caused by the subsidiary maximums. However, it requires a troublesome operation to accurately align the positions of the slits or pinholes 47 and 48, and it is desirable to somehow positively eliminate the light components caused by the subsidiary maximums by a simple operation.

Accordingly, a description will now be given of an embodiment which can positively eliminate the light components caused by the subsidiary maximums by a simple operation.

Figure 7:
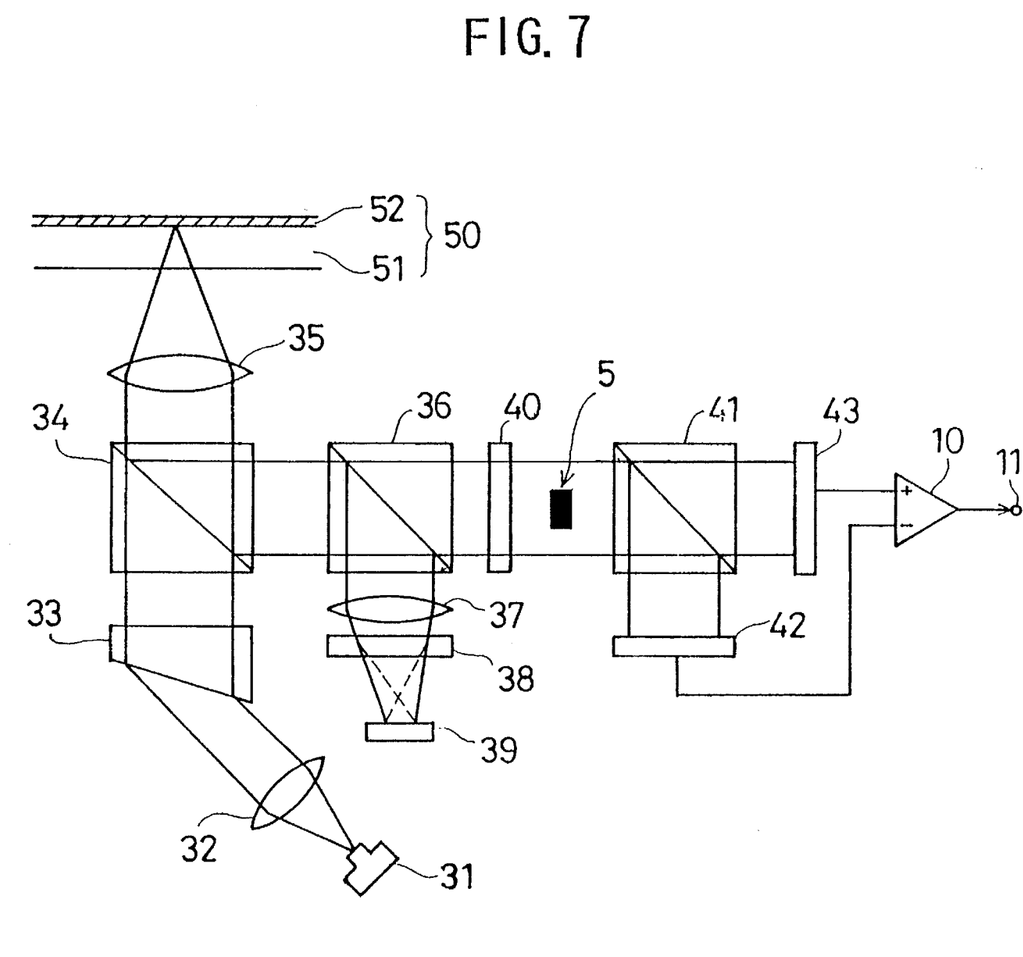
FIG. 7 is a diagram generally showing a second embodiment of the optical head according to the present invention.

FIG. 7 generally shows a second embodiment of the optical head according to the present invention. In this embodiment, the present invention is also applied to a magneto-optic head. In FIG. 7, those parts which are the same as those corresponding parts in FIG. 1 are designated by the same reference numerals, and a description thereof will be omitted.

In this embodiment, the light blocking plate 5 is provided between the ½ wave plate 40 and the deflection beam splitter 41, that is, in the reproducing optical path of the optical system which processes the reflected light from the magneto-optic disk 50. In addition, a differential amplifier 10 is provided to differentially amplify the outputs of the photodetectors 42 and 43. An output of the differential amplifier 10 is supplied to a correction circuit 20 shown in FIG. 8 via a terminal 11. In other words, the first embodiment described above uses the slits or pinholes 47 and 48 to eliminate the light components caused by the subsidiary maximums, but this second embodiment electrically eliminates the light components caused by the subsidiary maximums by the correction circuit 20 shown in FIG. 8.

Figure 8:
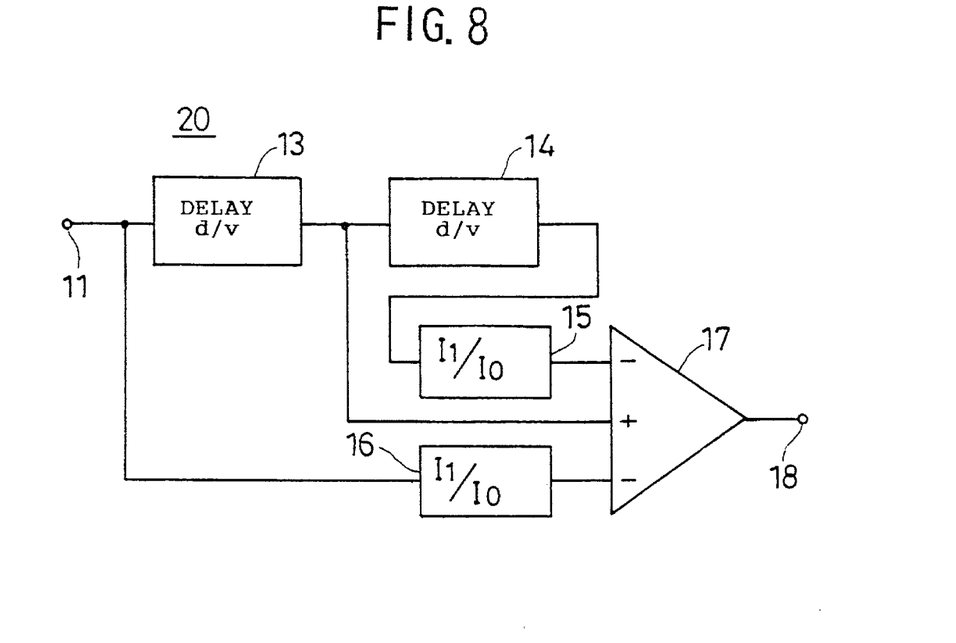
FIG. 8 is a block diagram showing an embodiment of a correction circuit.
Figure 9:
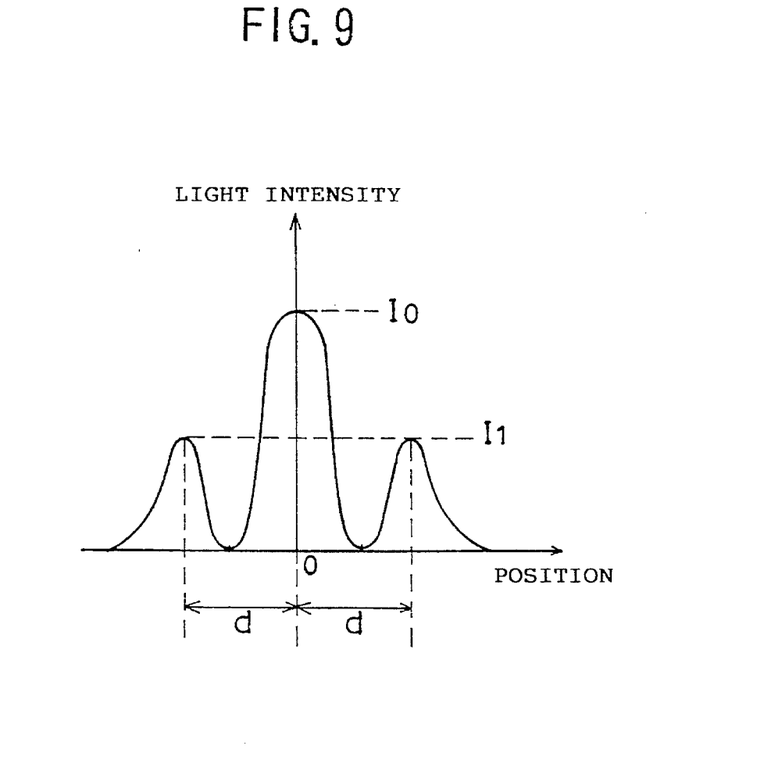
FIG. 9 is a diagram showing a light intensity distribution indicative of the relationship between the light intensity and position of the reproduced waveform.

FIG. 9 shows a light intensity distribution indicative of the relationship between the light intensity and position of the reproduced waveform. A position "0" in FIG. 9 corresponds to an optical axis of the optical system. In FIG. 9, the ordinate indicates the light intensity of the light spots converged on the photodetectors 42 and 43. As may be seen from FIG. 9, when the slits or pinholes 47 and 48 are not provided, the reproduced waveform of the reproduced signals detected by the photodetectors 42 and 43 includes the effects of the reproduced-signals which are based on subsidiary maximums I1 at positions a distance d from a main maximum I0 mixed to the reproduced signal which is based on the main maximum I0. The correction circuit 20 shown in FIG. 8 electrically eliminates the effects of the subsidiary maximums I1.

In FIG. 8, the correction circuit 20 includes d/v delay elements 13 and 14, I1/I0 multipliers 15 and 16, and a synthesizing circuit 17. The d/v delay element 13 delays the output of the differential amplifier 10 obtained via the terminal 11 by a time d/v, where d denotes the position of the subsidiary maximums I1 from the position of the main maximum I0 and v denotes a peripheral velocity of the magneto-optic disk 50. An output of the d/v delay element 13 is further delayed by a time d/v in the d/v delay element 14. In addition, the output of the d/v delay element 13 is also supplied to a non-inverting input terminal of the synthesizing circuit 17 as a reference signal.

An output of the d/v delay element 14 is multiplied by a light intensity ratio I1/I0 of the main maximum I0 and the subsidiary maximums I1 in the I1/I0 multiplier 15, and an output of the I1/I0 multiplier 15 is supplied to a first inverting input terminal of the synthesizing circuit 17. In addition, the output of the differential amplifier 10 obtained via the terminal 11 is multiplied by a light intensity ratio I1/I0 of the main maximum I0 and the subsidiary maximums I1 in the I1/I0 multiplier 16, and an output of the I1/I0 multiplier 16 is supplied to a second inverting input terminal of the synthesizing circuit 17.

As a result, signals which are supplied to the second and first inverting input terminals of the synthesizing circuit 17 are relatively advanced by a time d/v and delayed by a time d/v with respect to the reference signal which is supplied to the non-inverting input terminal of the synthesizing circuit 17. The synthesizing circuit 17 subtracts the relatively advanced signal and the relatively delayed signal which are supplied to the second and first input terminals from the reference signal which is supplied to the non-inverting input terminal, so as to obtain a reproduced signal which is eliminated of the effects of the subsidiary maximums I1. This reproduced signal is output via a terminal 18. Hence, the correction circuit 20 shown in FIG. 8 forms a transversal filter.

According to this embodiment, the light components caused by the subsidiary maximums are eliminated electrically, without providing the slits or pinholes 47 and 48. For this reason, there is no need to carry out the troublesome operation of aligning the positions of the slits or pinholes 47 and 48, and the light components caused by the subsidiary maximums can positively be eliminated by a simple operation.

Figure 10:
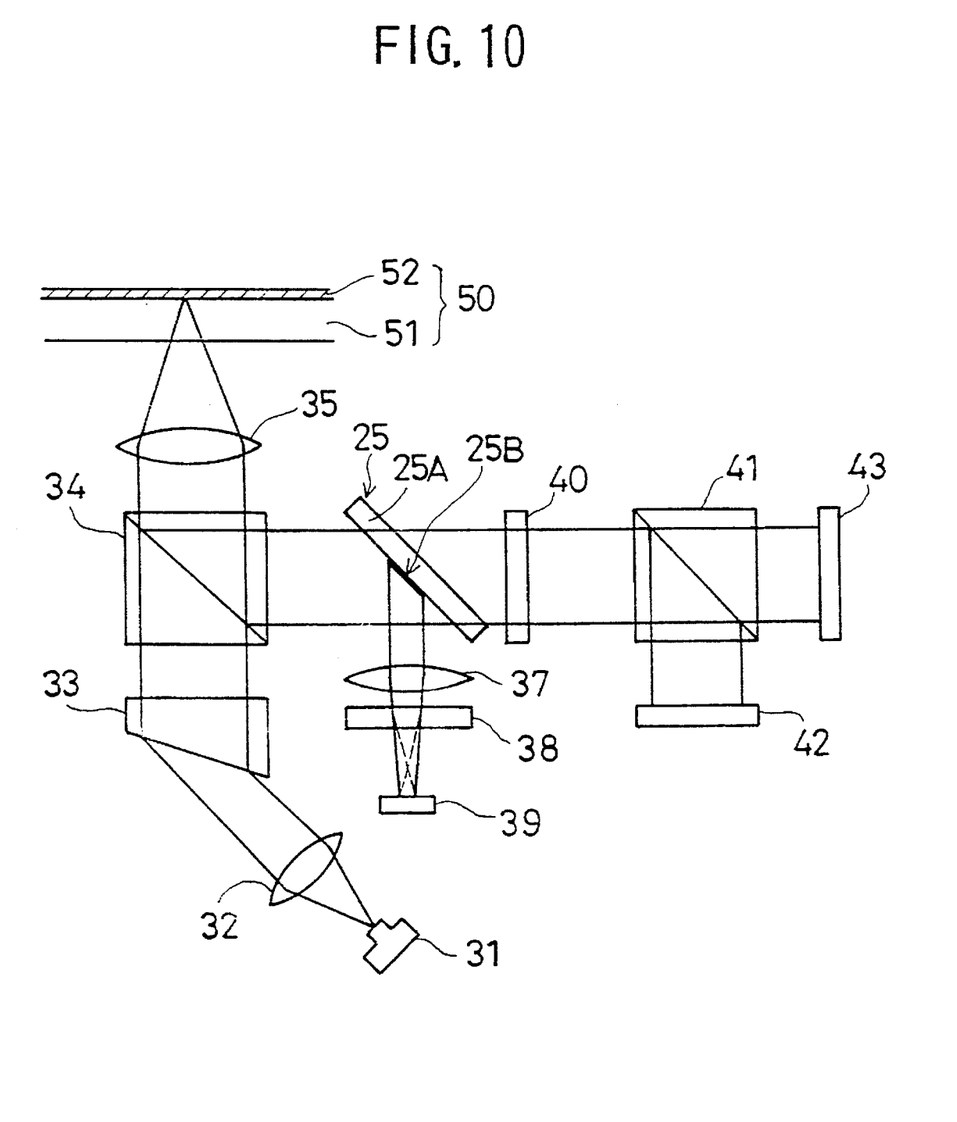
FIG. 10 is a diagram generally showing a third embodiment of the optical head according to the present invention.

FIG. 10 generally shows a third embodiment of the optical head according to the present invention. In this embodiment, the present invention is also applied to a magneto-optic head. In FIG. 10, those parts which are the same as those corresponding parts in FIG. 1 are designated by the same reference numerals, and a description thereof will be omitted.

In this embodiment, a beam splitter 25 is provided in place of the beam splitter 36 shown in FIG. 1. The beam splitter 25 includes a transparent substrate 25A, and a reflecting layer 25B which is formed on the transparent substrate 25A. Similarly to the non-transparent layer 5B shown in FIG. 6A, the width of the reflecting layer 25B is set so as to reflect the central portion of the reflected light from the magneto-optic disk 50 if the reflecting layer 25B has a band shape. On the other hand, if the reflecting layer 25B has a circular shape, the diameter of the reflecting layer 25B is set so as to reflect the central portion of the reflected light from the magneto-optic disk 50, similarly to the non-transparent layer 5B shown in FIG. 6B. Of course, the shape of the reflecting layer 25B is not limited to the band shape and the circular shape, and similarly as in the case of the light blocking plate 5 described above, the light reflecting portion of the beam splitter 25 may take an arbitrary shape that is set so as to improve the resolution in a direction in which recording tracks of the magneto-optic disk 50 extend.

In the first and second embodiments described above, the central portion of the reflected light from the magneto-optic disk 50 is blocked by the light blocking plate 5, and thus, the central portion of the reflected light is not used. However, in this third embodiment, the provision of the reflecting layer 25B enables light components which are substantially the same as those obtained by blocking the reflected light by the light blocking plate 5 to be supplied to the magneto-optic reproduced signal detection system, while at the same time enabling the light components corresponding to the central portion of the reflected light to be supplied to the focal error and tracking error detection system. For this reason, it is possible to supply to the focal error and tracking error detection system the light components which have a higher light intensity compared to those of the first and second embodiments, and this third embodiment more effectively utilizes the reflected light from the magneto-optic disk 50.

The position where the central portion of the reflected light from the magneto-optic disk is blocked or reflected is of course not limited to those of the embodiments described above. In principle, the central portion of the reflected light from the magneto-optic disk may be blocked or reflected at any position in the reproducing optical path of the optical system which processes the reflected light from the magneto-optic disk.

In addition, although the present invention is applied to the magneto-optic head in each of the embodiments described above, the present invention is of course applicable to any type of optical head which is designed to record and/or reproduce information optically on and/or from an optical recording medium.

The optical head according to the present invention may be employed when carrying out optical recording and/or reproducing methods. The optical recording may also employ the optical head of the present invention when detecting the recording track (recording position) at the time of the recording by a known means which detects the address or the like prerecorded on the optical disk. This is the reason why the optical head according to the present invention is not only applicable to the optical reproducing method by also to the optical recording method.

Further, the present invention is not limited to these embodiments, but various variations and modifications may be made without departing from the scope of the present invention.

What is claimed is:

1. An optical head comprising:

a lens system forming light reflected from an optical disk into parallel a focal error and tracking error detection system detecting focal error and tracking error based on said parallel rays;

an optical reproduced signal detection system detecting a reproduced signal reproduced from said optical disk based on said parallel rays;

light blocking means for blocking, out of said parallel rays, a portion of said parallel rays including at least a central portion in a light amplitude distribution in a cross-section of said parallel rays supplied to said optical reproduced signal detection system; and suppression means for suppressing effects of subsidiary maximums relatively introduced in a light amplitude distribution of a light spot which is converged by said optical reproduced signal detection system with respect to a reproduced waveform of said reproduced signal by blocking said central portion of said parallel rays.

2. The optical head as claimed in claim 1, wherein said light blocking means includes a circular or band-shaped light blocking portion for blocking the central portion of the parallel rays, so that a resolution of the optical disk is improved in a direction in which recording tracks of the optical disk extend.

3. The optical head as claimed in claim 1, wherein said suppression means includes a transversal filter electrically suppressing the effects of said subsidiary maximums with respect to said reproduced waveform of said reproduced signal.

4. The optical head as claimed in claim 1, wherein said light blocking means includes reflecting means for blocking the central portion of the parallel rays with respect to said optical reproduced signal detection system by reflecting the central portion of the parallel rays.

5. The optical head as claimed in claim 4, wherein said reflecting means of said light blocking means includes a circular or band-shaped light reflecting portion for reflecting the central portion of the parallel rays, so that a resolution of the optical disk is improved in a direction in which recording tracks of the optical disk extend.

6. An optical recording and/or reproducing method comprising the steps of:

(a) forming reflected light from an optical disk into parallel rays;

(b) detecting focal error and tracking error based on said parallel rays;

(c) detecting an optical reproduced signal reproduced from the optical disk based on said parallel rays;

(d) blocking, out of said parallel rays, a portion of said parallel rays including at least a central portion in a light amplitude distribution in a cross-section of parallel rays used for the detection of the optical reproduced signal; and (e) suppressing effects of subsidiary maximums relatively introduced in a light amplitude distribution of a light spot which is converged by an optical reproduced signal detection system which detects said optical reproduced signal with respect to a reproduced waveform of said reproduced signal by blocking said central portion of said parallel rays.

7. The optical recording and/or reproducing method as claimed in claim 6, wherein said step (e) uses a transversal filter for electrically suppressing the effects of said subsidiary maximums with respect to said reproduced waveform of said reproduced signal.

8. The optical recording and/or reproducing method as claimed in claim 6, wherein said step (d) uses reflecting means for blocking the central portion of the parallel rays with respect to an optical reproduced signal detection system which detects the optical reproduced signal by reflecting the central portion of the parallel rays.

9. The optical recording and/or reproducing method as claimed in claim 8, wherein said step (d) used reflecting means including a circular or band-shaped light reflecting portion for reflecting the central portion of the parallel rays, so that a resolution of the optical disk is improved in a direction in which recording tracks of the optical disk extend.

10. The optical recording and/or reproducing method as claimed in claim 6, wherein said step (d) uses light blocking means including a circular or band-shaped light blocking portion for blocking the central portion of the parallel rays, so that a resolution of the optical disk is improved in a direction in which recording tracks of the optical disk extend.

* * * * *

UNITED STATES PATENT AND TRADEMARK OFFICE
CERTIFICATE OF CORRECTION

PATENT NO. : 5,610,895
DATED : March 11, 1997
INVENTOR(S) : Izumi et al.

It is certified that error appears in the above-indentified patent and that said Letters Patent is hereby corrected as shown below:

Column 7, line 44, after "parallel" insert --rays;--.

Signed and Sealed this

Eleventh Day of November, 1997

Attest:

BRUCE LEHMAN

*Attesting Officer*  *Commissioner of Patents and Trademarks*